United States Patent [19]

Chana

[11] 4,153,147
[45] May 8, 1979

[54] TORQUE CONVERTER AND TORQUE ENGAGED SLIPPING CLUTCH

[75] Inventor: Howard E. Chana, Troy, Mich.

[73] Assignee: General Motors Corporation, Detroit, Mich.

[21] Appl. No.: 845,644

[22] Filed: Oct. 26, 1977

[51] Int. Cl.² .............................................. F16H 45/02
[52] U.S. Cl. .................................. 192/3.28; 192/3.29; 192/54
[58] Field of Search ...................... 192/3.28, 3.29, 3.3, 192/3.31, 54, 55

[56] References Cited

U.S. PATENT DOCUMENTS

| 1,921,014 | 8/1933 | Weiss | 192/54 X |
| 2,865,483 | 12/1958 | Livezey | 192/54 X |

FOREIGN PATENT DOCUMENTS 875501 8/1961 United Kingdom ..................... 192/3.31

*Primary Examiner*—Benjamin W. Wyche
*Attorney, Agent, or Firm*—Donald F. Scherer

[57] ABSTRACT

A torque converter and mechanically engaged slipping clutch wherein the impeller is driven by the input shell through a cam mechanism. The impeller has a clutch engaging mechanism which moves axially, due to the drive torque transmitted through the cam mechanism, to enforce slipping frictional engagement of the clutch disposed between the input shell and the turbine. The cam surfaces are designed such that the clutch cannot transmit all of the input torque since this would result in zero (0) torque transmission to the cam mechanism thereby releasing the clutch engagement force.

3 Claims, 4 Drawing Figures

TORQUE CONVERTER AND TORQUE ENGAGED SLIPPING CLUTCH

This invention relates to drive mechanisms having a torque converter and a clutch in parallel drive relation and more particularly to such drive mechanisms wherein the clutch is mechanically engaged and maintained in slipping engagement.

It is an object of this invention to provide an improved torque converter and slipping clutch wherein the clutch engagement force and therefore the torque transmission through the clutch is controlled by the torque input to the impeller of the torque converter.

Another object of this invention is to provide an improved torque converter slipping clutch wherein the impeller of the torque converter is driven by the input through a cam which enforces axial movement of the clutch apply member to mechanically engage the clutch, between the input and the turbine, with sufficient force to cause a portion of the input torque to be transmitted by the clutch and the remainder is transmitted by the torque converter.

These and other objects and advantages of the invention will be more apparent from the following description and drawings in which.

Figure 1:
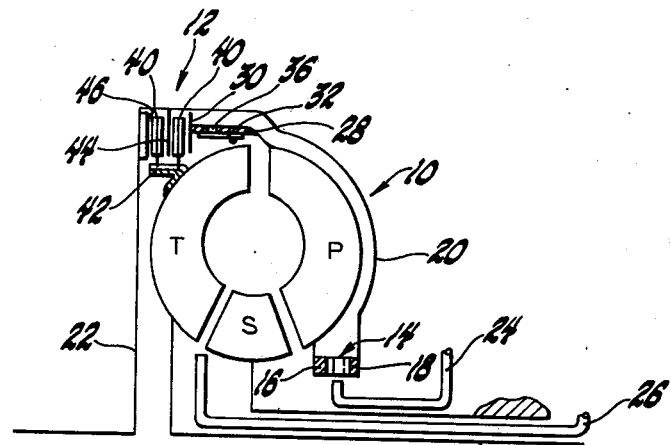
FIG. 1 is a diagrammatic view of a torque converter and clutch.
Figure 2:
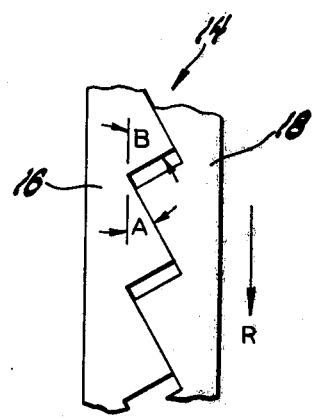
FIG. 2 is a top view of the drive cam.
Figure 3:
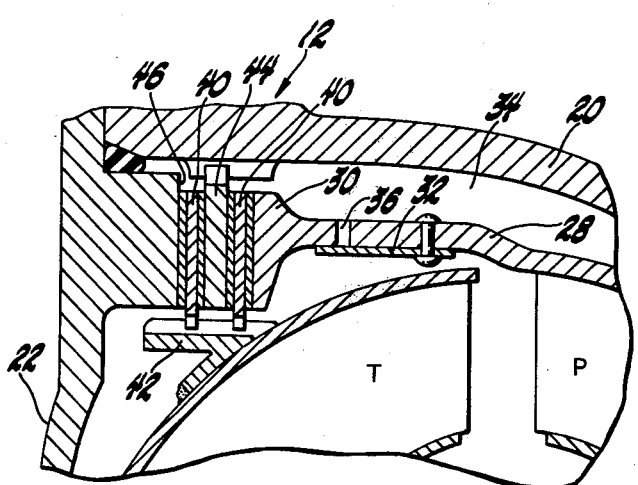
FIG. 3 is an enlarged sectional view of a portion of the torque converter and clutch.

Referring to the drawing, and particularly FIG. 1 there is seen a drive mechanism having a torque converter generally designated 10 and a clutch generally designated 12. The torque converter 10 has an impeller or pump P, a turbine T, and a stator S. These components are combined in a conventional manner to provide a well known fluid drive. The impeller P is driven by a cam mechanism 14 which has the impeller side 16 thereof connected to the impeller P and the drive side 18 thereof connected to a drive shell 20. The shell 20 is secured to an input shell 22 which is adapted to be driven by a prime mover, not shown, such as an internal combustion engine. The fluid necessary to operate the torque converter 10 passes through passages 24 and 26. When the passage 24 is pressurized and the passage 26 is connected to exhaust, the clutch 12 can be engaged, when the passage 26 is pressurized and the passage 24 is connected to exhaust, the clutch 12 will be disengaged. The admission of pressure or connection to exhaust of the passages 24 and 26 can be accomplished by any of the well known valve mechanisms, such as that shown in U.S. Pat. No. 3,693,478 issued Sept. 16, 1972 to John D. Malloy, for providing this type of fluid connection. As best seen in FIG. 3, the impeller P has an annular extension 28 which ends in an enlarged annular portion 30 which cooperates with the impeller P to provide a clutch engaging surface for the clutch 12. Also disposed on the annular portion 28 is a reed valve 32 which functions to admit fluid from a chamber 34 between the shell 20 and shell 28 to the torque converter through a passage 36. This reed valve 32 is a one way valve such that when fluid pressure is admitted to passage 26 the reed valve is closed whereby the internal pressure within the torque converter will maintain the clutch 12 disengaged.

The clutch 12 is comprised of a plurality of friction disks 40 which are splined to the turbine T through an annular member 42 and a friction disk 44 which is splined to the shell 20. The input shell 22 has a flattened annular surface 46 which serves as a backing surface for the clutch 12.

When the input shell 22 and therefore shell 20 are driven by the prime mover, the cam surface 18 is driven in the direction of arrow R such that the cam surfaces 16 and 18, between the shell 20 and impeller P, cause rotation of the impeller. It is well known that when the impeller is rotated the fluid is circulated within the torus of the torque converter to result in an output drive from the turbine T through a shaft 48. The cam angle A between the surfaces 16 and 18 determines separating force between these surfaces such that, when sufficient input force is applied to surface 18, the cam surfaces 16 and 18 will move axially relative to each other resulting in axial movement of the impeller P and therefore the annular extension 28. This movement of annular extension 28 results in engagement of the clutch 12 such that a drive is transmitted directly from the input shell 22 to the turbine T and then to the shaft 48. However, it will be appreciated that if the clutch 12 provides all the drive from input shell 22 to turbine T the force on the cam surfaces 16 and 18 will go to zero which will result in low axial force for maintaining the clutch engagement and the clutch will therefore disengage. It should therefore be appreciated that, the cam will transmit sufficient torque to the impeller P to maintain the clutch in slipping engagement such that the input shell 22 and impeller P will run slightly faster than the turbine T. However, the slip speed between the impeller P and turbine T will be less than a conventional torque converter.

From the foregoing description it is therefore apparent that the clutch is mechanically engaged and does not rely on any internal fluid pressure in the system to maintain the engagement. The cam angle A determines the torque split which will occur between the torque converter 10 and the clutch 12 as will be apparent to those skilled in the art.

During coast drive, the turbine T overruns the impeller P. The impeller P then drives through the cam 16 to cam 18 and thence back to the prime mover for engine braking. Since it is desirous to maintain the clutch substantially disengaged during engine coast, the cam angle B is made very large to reduce the likelihood of clutch engagement during coasting. It should be understood of course, that if it is desirable to engage the clutch 12 during coast down angle B can be defined to provide that desired engagement.

Figure 4:
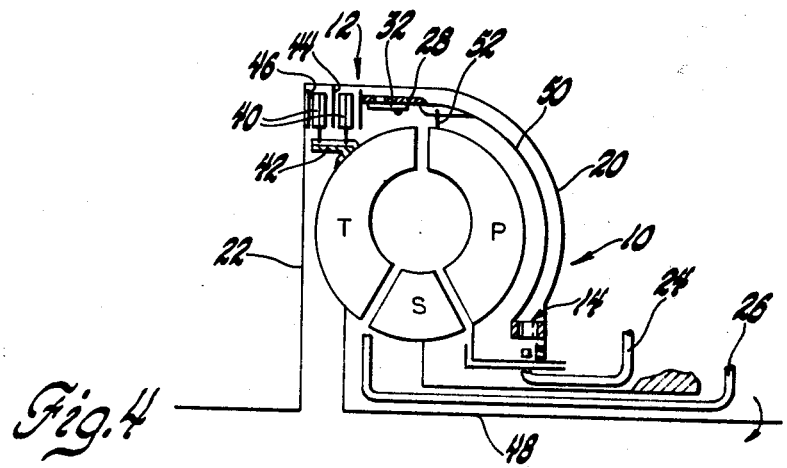
FIG. 4 is a diagrammatic representation of a torque converter and clutch showing another embodiment of the invention.

The torque converter and slipping clutch, shown in FIG. 4, is substantially the same as that shown in FIG. 1. This drive mechanism includes the input shell 22, the friction clutch generally designated 12, the torque converter generally designated 10, the drive shell 20 and cam mechanism 14. The cam mechanism 14 is connected between the drive shell 20 and a clutch engaging shell 50. The clutch engaging shell 50 is splined to the impeller P at 52 and has formed thereon the annular shell 28 and reed valve 32 which functions as described above for FIG. 1. In FIG. 4 the clutch engagement results from axial movement of the clutch engaging shell 50 and the impeller P remains stationary in an axial direction. The spline connection 52 permits this axial play of input shell 50 relative to the impeller P. It should however be appreciated that in FIG. 4, it continues to be necessary to have some input torque supplied to the impeller P before clutch engagement can be accomplished. This is true because the input torque which results in moving the clutch engagement shell 50 must pass through the clutch engagement shell to the impeller at the spline connection 52. If the clutch 12 should attempt to reach a fully locked position such that the power is transmitted directly from input shell 22 to the turbine T, the force on the cam 14 would approach zero thereby releasing the clutch engagement force which was present on the clutch engagement shell 50. With this force released the clutch would become disengaged and the drive would have to be through the torque converter only. Thus it is apparent that the clutch 12 will be maintained in a slipping engagement. The torque converter 10 in FIG. 4 is also supplied with fluid through the passages 24 and 26 in a manner similar to that described above for FIG. 1.

Obviously, many modifications and variations of the present invention are possible in light of the above teaching. It is therefore to be understood, that within the scope of the appended claims the invention may be practiced otherwise than as specifically described.

I claim:

1. A drive system having a torque converter for transmitting fluid power and a mechanically engagable slipping clutch in parallel therewith for transmitting mechanical power comprising; an input member adapted to be driven by a prime mover power source; an output member; an impeller; a turbine member drivingly connected to said output member and cooperating with said impeller to transmit fluid power from said impeller to said output member; clutch apply means connected to said impeller; cam means having interengaging elements on said input member and on said clutch apply means, respectively, for transmitting drive torque from the input member to the impeller and effective to axially shift the clutch apply means in accordance with the drive torque forces; clutch means having frictionally engaging faces connected to said input member and to said turbine so as to establish an independent drive path therebetween as the clutch apply means is axially shifted, whereby axial movement of the clutch apply means in response to the torque transmitted by said cam means engages said clutch means to provide a torque split between said torque converter and said clutch.

2. A drive system having a torque converter for transmitting fluid power and a mechanically engagable slipping clutch in parallel therewith for transmitting mechanical power comprising; an input member adapted to be driven by a prime mover power source; an output member; an impeller; a turbine member drivingly connected to said output member and cooperating with said impeller to transmit fluid power from said impeller to said output member; cam means having interengaging elements on said input member and on said impeller, respectively, for transmitting drive torque from the input member to the impeller and effective to axially shift the impeller toward the turbine in accordance with the drive torque forces; clutch means having frictionally engaging faces connected to said input member and to said turbine so as to establish an independent drive path therebetween as the impeller is axially shifted, whereby axial movement of the impeller in response to the torque transmitted by said cam means engages said clutch means to provide a torque split between said torque converter and said clutch.

3. A drive system having a torque converter for transmitting fluid power and a mechanically engagable slipping clutch in parallel therewith for transmitting mechanical power comprising; an input member adapted to be driven by a prime mover power source; an output member; an axially restrained impeller; a turbine member drivingly connected to said output member and cooperating with said impeller to transmit fluid power from said impeller to said output member; a clutch apply member splined to said impeller; cam means having interengaging elements on said input member and on said clutch apply member, respectively, for transmitting drive torque from the input member through said clutch apply member to the impeller and being effective to axially shift the clutch apply member toward the turbine in accordance with the drive torque forces transmitted to the impeller; clutch means having frictionally engaging faces connected to said input member and to said turbine so as to establish an independent drive path therebetween as the clutch apply member is axially shifted, whereby axial movement of the clutch apply member in response to the torque transmitted by said cam means engages said clutch means to provide a torque split between said torque converter and said clutch.

* * * * *